United States Patent [19]
Eidam

[11] 4,204,303
[45] May 27, 1980

[54] LOCKING MECHANISM FOR MACHINE TOOL HOLDER/ADAPTER

[76] Inventor: Lane L. P. Eidam, 38 Watergate, South Barrington, Ill. 60010

[21] Appl. No.: 857,386

[22] Filed: Dec. 5, 1977

[51] Int. Cl.² .................. B23B 31/16; B23Q 3/157
[52] U.S. Cl. .................... 29/26 A; 29/568; 279/82; 408/35; 409/232
[58] Field of Search ............ 90/11 A; 29/26 A, 568; 408/35, 238; 279/1 B, 1 SG, 24, 28, 29, 82, 87, 89; 409/232

[56] References Cited

U.S. PATENT DOCUMENTS

| | | | |
|---|---|---|---|
| 2,990,189 | 6/1961 | Beers | 279/1 B |
| 3,895,881 | 7/1975 | Langlois | 408/239 |
| 3,999,769 | 12/1976 | Bayer et al. | 279/1 B |

Primary Examiner—Z. R. Bilinsky
Attorney, Agent, or Firm—Gerald S. Geren

[57] ABSTRACT

There is disclosed herein an improved machine tool holder/adapter and drive spindle nose. The drive spindle nose is tapered and includes a circumferential locking groove. The tool holder/adapter includes a tapered central recess for receiving said spindle nose and a plurality of radially movable lock pins. Biasing means are provided for direct coaction with the lock pin means so as to urge the lock pins in an outward direction. The length of the pins, the size of the spindle nose and the diameter of the circumferential groove are selected so as to prevent the spindle nose from striking the lock pins as the spindle nose moves into the tool holder/adapter for lockingly engaging said tool holder/adapter.

12 Claims, 5 Drawing Figures

LOCKING MECHANISM FOR MACHINE TOOL HOLDER/ADAPTER

BACKGROUND OF THE INVENTION

This invention relates to high speed, high torque automatic machine tools, and more particularly, to apparatus for quickly and securely locking a tool holder/adapter to a drive spindle associated with the machine tool.

Modern high speed machine tools employ many different types of tools for drilling, boring, milling, etc., in its machining operation. Each tool is mounted to a tool holder/adapter which is selectively engaged by the machine's drive spindle to perform the desired machining operation. U.S. Pat. No. 3,999,769 discloses one such tool holder/adapter.

Desirably, the tool holder/adapter cooperates with the drive spindle to permit quick and secure changing from one tool to another. When not in use, the tool holder/adapter is stored in a turret on the machine. When a tool is to be used, the turret is moved to align the tool holder/adapter with the drive spindle, which is then moved downwardly to engage the tool holder/adapter and release it from the turret. U.S. Pat. No. 3,999,769 discloses a spindle which includes a step-shaped nose for engagement by the tool holder/adapter. The tool holder/adapter includes a straight-sided central recess for receiving the nose, a peripheral retainer cup or locking ring, and a lock pin and a detent pin mechanism, all of which are intended to selectively secure the tool holder/adapter to either the spindle nose or the turret.

The locking mechanism includes three radially movable lock pins, each end of which is provided with a shaped face having a straight edge thereacross which is to be positioned in a horizontal attitude. Each locking pin is movable within a passageway toward and away from the central recess. An axially-movable spring-loaded detent pin is provided for cooperation with each locking pin. The detent pin is positioned partially in the passageway and partially in the central recess.

In the stored position in the turret: (1) the peripheral retainer cup is held in a downward position; (2) the lock pin is positioned radially outwardly with its inner end fully within the passageway and its outer end engaging the turret; and (3) the detent pin is positioned upwardly and contacts the inner end of the lock pin within the passageway and is intended to hold the lock pin in the outward position. When the drive spindle is moved into the central recess, it is intended that it engage the top side of the detent pin, and push it downwardly so as to release the lock pin and permit it to move inwardly into the recess. As the drive spindle urges the tool holder/adapter downwardly, the lock pin moves inwardly, the outer end releases from the turret and the inner end engages the stepped spindle nose. At the same time, the retainer cup moves upwardly to prevent the lock pin from moving outwardly and releasing the nose until the tool holder/adapter is returned to storage.

Although this system is intended to provide positive locking to the spindle and to the turret, it has been found: (1) that the tool holder/adapters have been driven from the turret without engaging the spindle nose; and (2) that positive locking to the turret for storage has not always been achieved.

The reason for the foregoing problems appears to be related to improper functioning of the locking pin due to sticking or slippage of the detent pin. For example, if only one of the detent pins sticks and fails to engage the associated locking pin, the tool holder/adapter may not lock securely to the turret. Thus, the locking pin may extend into the central cavity so that: (1) when the spindle nose enters the recess, it will strike the top of the locking pin, thereby driving the holder/adapter from the turret, without the nose being securely engaged; or (2) the tool holder/adapter may work loose from the turret during operation of the machine.

It is also possible that due to the sloped and mating surfaces of the detent pin and locking pin, the locking pin can work against the detent pin in a cam-like manner so as to urge the detent pin downwardly and (1) permit the lock pin to move inwardly and be struck by the descending spindle nose or (2) permit the tool holder/adapter to work loose from the turret.

It is therefore an object of this invention to provide a mechanism for securely and safely locking a tool holder/adapter in a storage position and to a drive spindle nose.

These and other objects of this invention will become apparent from the following description and appended claims.

SUMMARY OF THE INVENTION

There is provided by this invention a tool holder/adapter having a mechanism for securely and safely locking the tool holder/adapter to a turret for storage and to a drive spindle for operation. The tool holder/adapter for this mechanism includes a tapered central recess and a directly and outwardly biased locking pin having an arcuate inner end and shaped outer end. The drive spindle nose is tapered for cooperation with the tool holder/adapter and includes a peripheral groove for receiving the inner end of the locking pin.

DESCRIPTION OF THE PREFERRED EMBODIMENT

General

Figure 1:
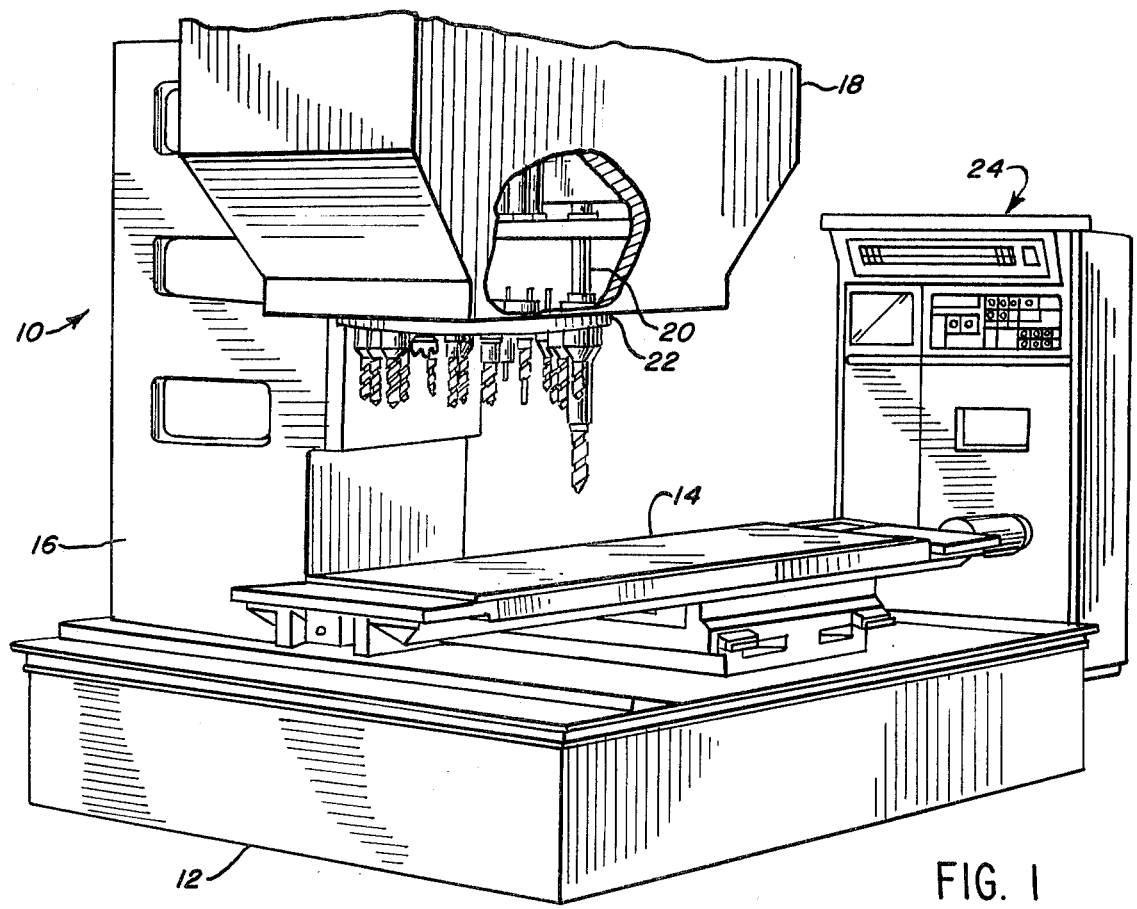
FIG. 1 is a perspective view showing a machine tool.

Referring now to FIG. 1, there is shown a machine tool 10 which is an automatically-controlled machine tool adapted to perform several successive machining operations that require numerous tools to be exposed and ready for use. The machine includes a bed 12 having a movable table 14 thereon. A frame 16 extends upwardly from the bed and a drive housing 18 is mounted to the frame. The drive shaft and tool spindle 20 are positioned within the housing 18 for both axially reciprocable and rotational movement.

An annular tool holding turret plate 22 is mounted to the bottom of the housing and is rotatable so that each tool in the turret plate can be aligned with the spindle 20.

A numerical control center 24 is provided for automatically operating the tool selection and worktable positioning processes. Alternatively, these functions may be controlled mechanically or by tape.

The Tool Holder/Adapter and The Spindle Nose

Figure 2:
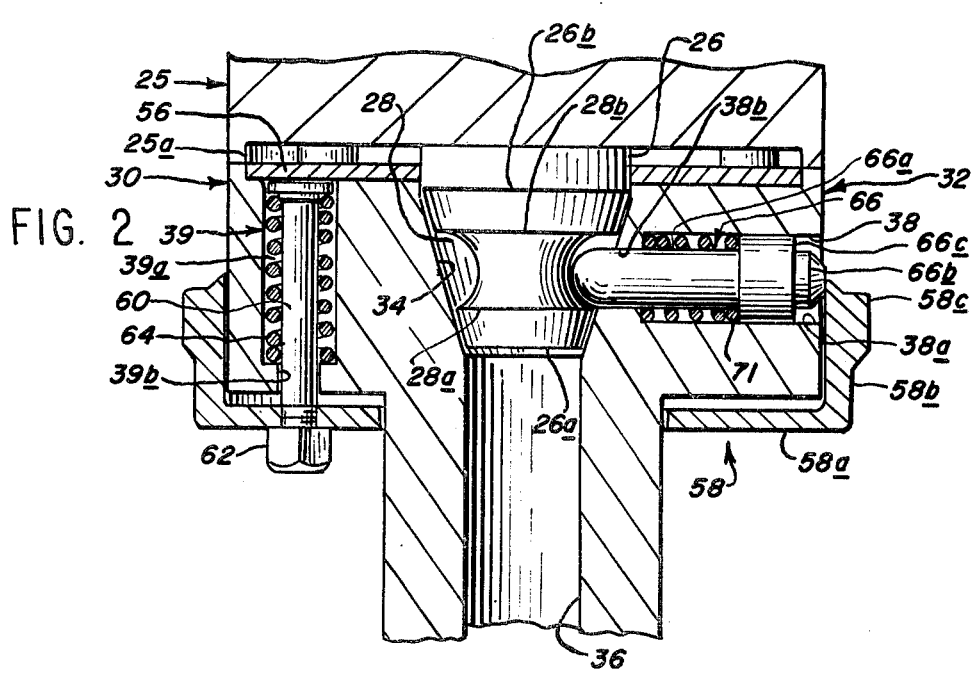
FIG. 2 is a view partially in section and partially in elevation showing the tool holder/adapter locked to the spindle nose.

Referring now to FIG. 2, the drive spindle 20 terminates in an end face 25 which has a peripheral shoulder 25a. A tapered nose section 26 extends from the end face and has a small diameter lower end 26a, a large diameter upper end 26b, and a circumferential locking-pin-receiving groove 28 therebetween. The groove defines lower and upper groove edges 28a and 28b, respectively.

Figure 4:
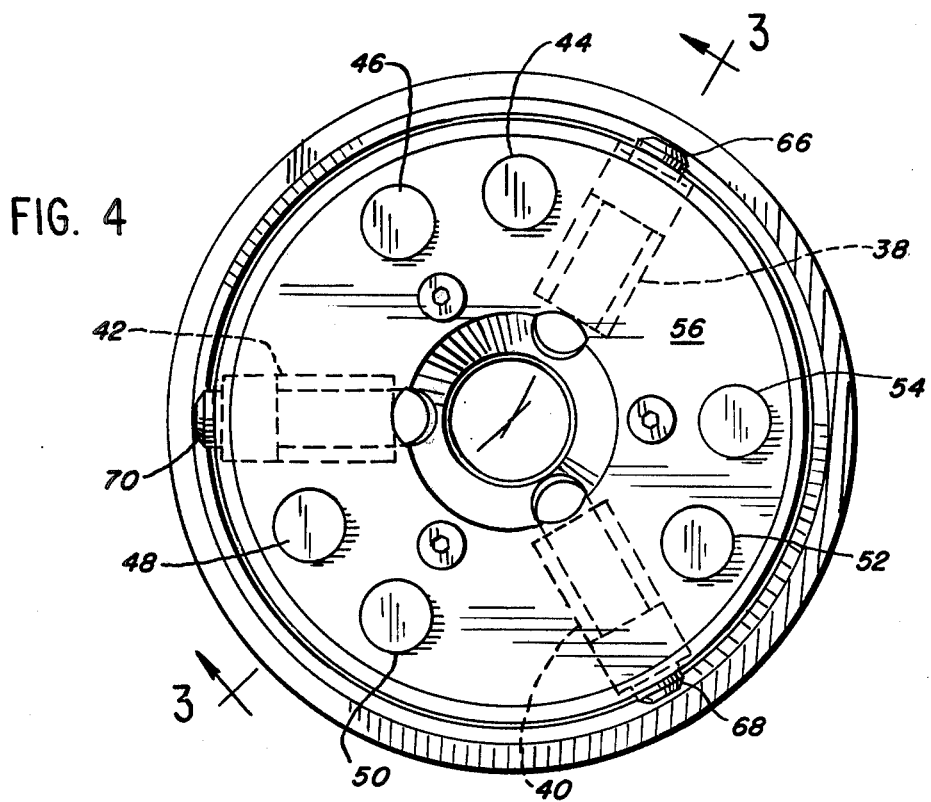
FIG. 4 is a top plan view of the tool holder/adapter locked to the turret.

The tool holder/adapter 30 includes a body portion 32 having a tapered nose-receiving central recess 34 which terminates at a cylindrical bore 36. The central recess 34 is slightly larger than the tapered nose section 26. Three radially-oriented lock pin passageways 38, 40, and 42 (as seen in FIG. 4) are provided in the body. Each includes a long, large diameter outer section or counter-bore, such as 38a, and a smaller diameter inner section 38b. The outer section opens to the outside or periphery of the tool holder/adapter, and the inner section opens into the central recess 34.

A plurality of axial retainer-biasing passages, such as 39, are also provided. Each includes a long, large diameter upper section or counterbore 39a, and a shorter, small diameter lower section 39b.

Six upwardly-biased spindle-engaging shot bolts 44, 46, 48, 50 and 54 (as shown in FIG. 4), are also carried in the body 32. The shot bolts cooperate with shot-bolt receiving cavities in the end face of the spindle so as to permit the spindle to rotate or drive the tool holder/adapter. A face plate 56 is secured to the body to retain the shot bolts and closes the top end of the passageway 39.

An axially movable upwardly biased retainer cup or locking ring 58 is positioned about the lower portion of the tool holder/adapter and includes an annular bottom wall 58a and an upwardly-extending peripheral wall 58b that extends upwardly so as to cover at least a portion of the outer opening to the passages, such as 38. The upper end 58c of wall 58b forms a shaped abutment shoulder.

The retainer cup 58 is carried by the holder/adapter body 32 and is biased toward the body by spring-biased bolts, such as 60, which are positioned in the passage 39, extend from the body 32 through the cup bottom wall 58a have a nut, such as 62, secured to the lower end thereof. The bolt 60 has an enlarged head and a coiled compression spring 64 is fitted about the bolt body so as to urge the bolt 60 and retainer cup 58 upwardly toward the body while still permitting downward movement away from the body 32.

Three radial locking pins 66, 68 and 70 are provided and each is positioned in one of the passages, such as 38. Each pin, such as 66, has a length greater than that of the passage, and includes a long inner section 66a which terminates in a rounded tip that cooperates with the pin-receiving groove 28 in the nose 26. The pin also includes a short outer section 66b, the end of which is shaped to cooperate with the turret 22. A guide and spring-retaining collar 66c separates the inner and outer sections and cooperates in guiding the pin as it slides in the passage. A coiled compression spring 71 is fitted about the inner section 66a and bears against a shoulder in the counterbore 38a and the pin collar 66c so as to urge or bias the pin outwardly.

In the locked-to-the-nose position, the inner end of each of the pins 66, 68 and 70 is in the groove 28 and is held in the inner position by the retainer cup 58 which, in its upward position, prevents the pin 66 from moving outwardly. As is seen, the inner end of the pin 66 prevents the tool holder/adapter from moving downwardly and away from the nose since the lower edge 28a of the groove cannot move upwardly past the inner end of pin 66 as long as the pin is held in position by the retainer 58. At their inner position, the inner ends of the pins 66, 68 and 70 form a circle having a diameter greater than the diameter of the lower end 26a of the nose 26 so as to avoid possible interference between the nose end and the pins.

Tool Holder/Adapter and The Turret

Figure 3:
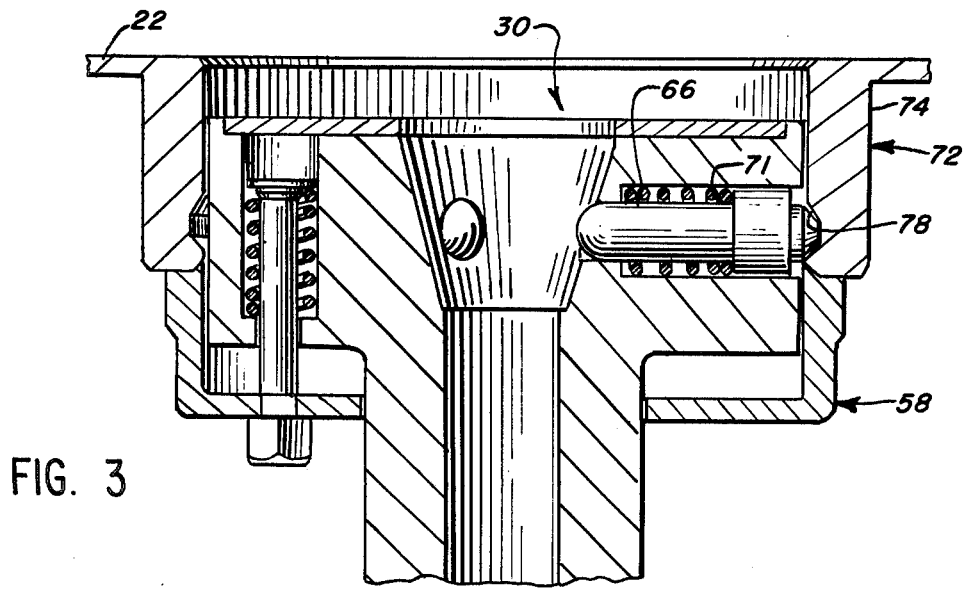
FIG. 3 is a vertical sectional view showing the tool holder/adapter locked to the turret.

Referring now to FIG. 3, the tool holder/adapter 30 is shown secured to a tool holder/adapter receiving ring 72, which is part of the turret 22. The ring 72 defines a circular opening and includes a downwardly-extending circular wall 74, which terminates in an abutment shoulder 76. An internal lock pin receiving groove 78 is provided in the inner surface of the ring adjacent the abutment shoulder 76 for receiving the outer end 66b of the locking pins, such as 66.

Figure 5:
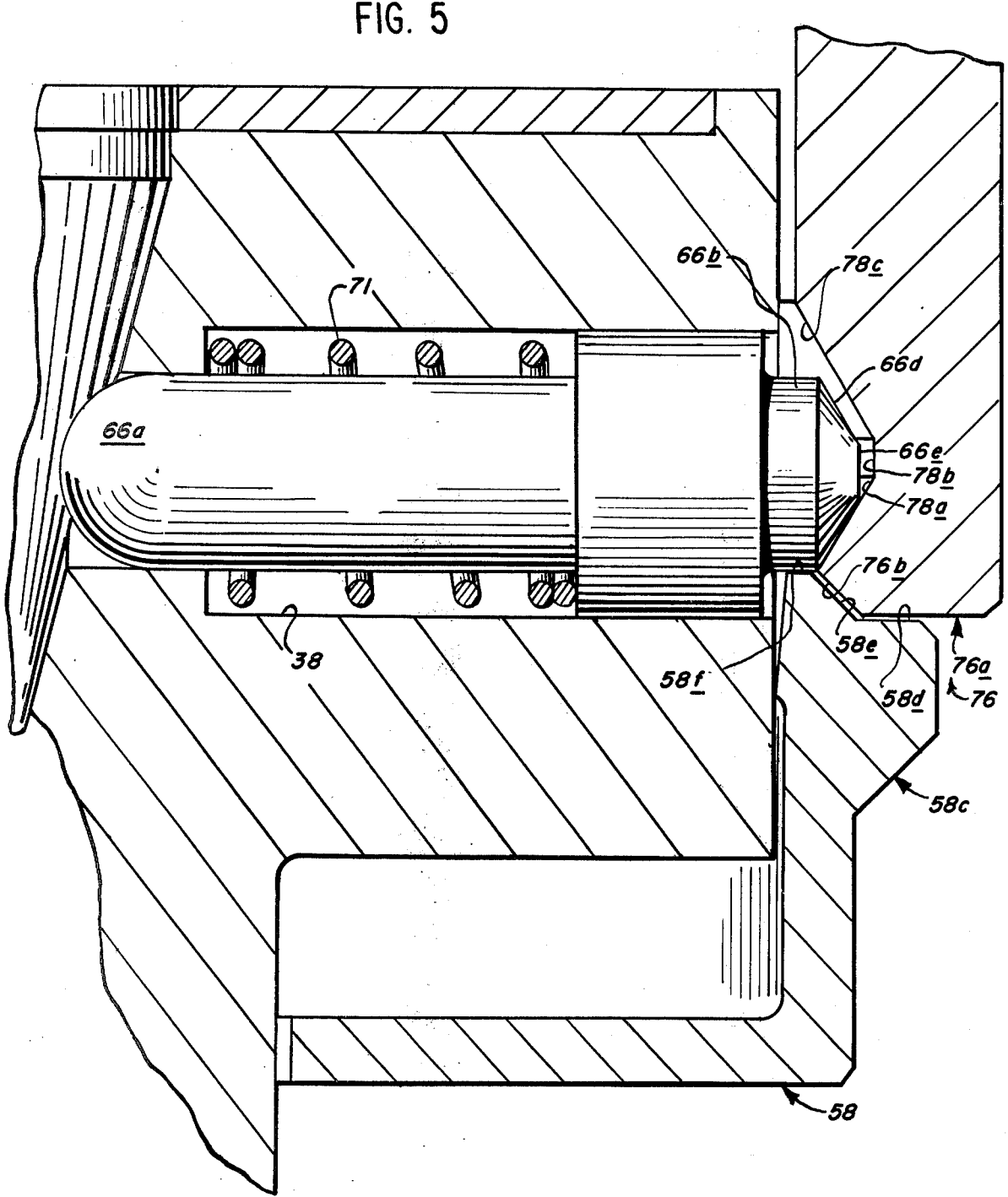
FIG. 5 is a greatly enlarged view showing one of the locking pins engaging the turret.

In FIG. 5, it is seen that the abutment shoulder 76 includes a flat surface 76a and a beveled, upwardly and inwardly sloping surface 76b.

The locking groove 78 includes: (a) an upwardly and outwardly directed lower surface 78a; (b) a short vertical central surface 78b; and (c) a longer upwardly and inwardly sloping upper surface 78c. The angular attitude of the surface 78a provides for mating between that surface and the lock pin end 66b. As is seen, the lock pin end 66b has a tapering surface 66d that terminates in a flat tip 66e.

The retainer cup 58 has an abutment shoulder 58c for abutting the turret ring shoulder 76. The retainer shoulder includes: (a) a flat surface 58d for engaging the ring surface 76a; (b) an upwardly and inwardly sloping surface 58e for cooperation with the surface 76b; and (c) a locking pin-engaging-and-restraining flat surface or land 58f for engaging the outer end 66b of locking pin 66 for imparting some frictional force for cooperation in inhibiting inward movement of the pin 66. Engagement of the pin end 66b by the land 58f prevents the forces from the retainer biasing springs 64 from acting on the pin end to cam or push it inwardly or work against the tapered surface 66d.

As shown in FIGS. 3 and 5, the tool holder/adapter is locked to the turret ring 72 by the pins, such as 66, which are held in position by the biasing action of springs, such as 68, and the effect of engagement with the land 58f.

Separating the Spindle Nose and Tool Holder/Adapter

Beginning with the tool holder/adapter 30 locked to the spindle nose 26 as shown in FIG. 2, in order to change tools the spindle is retracted or moved upwardly. After the tool holder/adapter enters the turret ring 72, the retainer cup shoulder 58c engages the ring abutment shoulder 76. As the spindle is moved upwardly, the tool holder/adapter body 30 remains locked to the spindle nose, but the body moves upwardly relative to the retainer cup 58 under the biasing action of the bolt and spring connections, such as 60, 62 and 64.

As the body moves upwardly, the outer opening of passage 38 is exposed. As this occurs, the biasing action of spring 71 and the camming action of groove 28 on the inner end 66a of the locking pin 66 urge the pin outwardly until it enters the turret groove 78. Simultaneously, the inner end of the pin is moved out of interference with the lower edge 28a of the locking groove so that the nose can now move upwardly past the pin. The length of the pin is selected such that only when the pin is seated in the locking groove can the lower edge 28a of the spindle nose move past the inner end of the lock pin.

After the spindle nose disengages from the lock pins, the tool holder/adapter settles slightly and the retainer ring land 58f engages the lock pin end 66b thereby securely locking the tool holder/adapter to the turret ring.

Locking the Tool Holder/Adapter To the Drive Spindle

In order to lock the tool holder/adapter to the drive spindle, the spindle is moved downwardly and the nose 26 moves into the central recess 34. As the nose 26 moves downwardly, the small diameter lower end 26a moves past the inner ends, such as 66a, of the pins 66.

As indicated before, the diameter of the lower end 26a is selected such that it will not contact or engage the inner end of the pins.

In the event that the pin end 66a extends inwardly, the tapered lead between the lower end 26a and the lower groove edge 28a will engage the inner end 66a of the locking pin and urge it outwardly to assure locking engagement with the turret and prevent the tool holder downwardly, the pin 66 slides into groove 28, and the tool holder/adapter 30 from being driven from the turret ring 72 before the tool holder/adapter is locked to the spindle. As the nose 26 moves downwardly, the groove edge 28a moves past the inner end of the pin 66, the end face 25 of the spindle engages the tool holder body urging the tool holder downwardly, the pin 66 slides into groove 28, and the tool holder/adapter body 32 can move downwardly from the ring 72. Since the nose 26 is smaller than the recess 34, the nose does not seat against or engage the walls of the recess.

The downward force causes the tapered surface 66d of the pin 66 to slide against the surface 78a and cause the pin 66 to move inwardly so as to release from the turret ring 72. The radius of the groove 28 and the shape of the inner end of pin 66 are selected such that as the pin 66 slides from the turret ring, the surfaces coact in a manner which draws the nose 26 and body 32 toward each other. As the pin 66 is releasing from the ring groove 78, the biasing action of the retainer-cup spring 64 urges the retainer cup 58 upwardly against the surface 66d to cam the pin inwardly relative to the tool holder/adapter body 30. Thus, as the pin moves inwardly, the retainer abutment shoulder 58c engages the taper, cooperates in moving the pin inwardly and then moves upwardly to retain the outer end of the pin within the passageway and thus the pin is locked to the nose.

At the same time, one of the shot bolts 44-54 seats in a shot-bolt-receiving cavity in the spindle so as to provide the rotary driving force.

As can be seen from the foregoing, this mechanism provides a positive lock between: (1) the holder/adapter and the nose; or (2) the holder/adapter and the turret. Furthermore, the size, shape and positioning of the parts prevents interference between the lock pins and the nose, which assures the positive locking.

It will be appreciated that numerous changes and modifications can be made to the embodiment shown herein without departing from the spirit and scope of this invention.

I claim:

1. An automatic machine tool, including:
   a rotatable and axially movable drive spindle having an end face and spindle nose means extending from the end thereof:
   a tool holder/adapter cooperatively associated with said machine tool for selective connection to said spindle nose means, said tool holder/adapter including a central recess for receiving said nose means and lock pin means for selectively locking said tool holder/adapter to said spindle nose means; and turret means for cooperation with said tool holder/adapter for storing said tool holder/adapter when not in use, the improvement comprising:
   said spindle nose means having a small diameter end spaced from said end face of said drive spindle, said nose section tapering from said small diameter end toward said end face and having means defining a circumferential locking groove in the tapered portion of said nose section;
   said tool holder/adapter having:
     a tapered central recess,
     means defining a plurality of substantially radially disposed lock pin passageways, each of said passageway means extending from said central recess to the periphery of said tool holder/adapter;
     a plurality of elongated lock pin means, each positioned for reciprocal movement in one of said passageway means and constructed to selectively and lockingly engage said locking groove; and
     biasing means for coaction with each of said pin means and said passageway means for directly applying a biasing force to said pin means so as to urge said pin means outwardly and away from said central recess.

2. A machine tool as in claim 1, wherein when said lock pin means are in their innermost position, the inner ends thereof determine a circle having a diameter greater than the diameter of the lower end of the nose so as to prevent interference between said nose means and said pin means.

3. An automatic machine tool, including:
   a rotatable and axially movable drive spindle having spindle nose means at the end thereof;
   a tool holder/adapter cooperatively associated with said machine tool for selective connection to said spindle nose means, said tool holder/adapter including a central recess for receiving said nose means and lock pin means for selectively locking said tool holder/adapter to said spindle nose means; and turret means for cooperation with said tool holder/adapter for storing said tool holder/adapter when not in use, the improvement comprising:
   said spindle nose means being tapered and having a circumferential locking groove therein;
   said tool holder/adapter having:
     a tapered central recess, means defining a plurality of substantially radially disposed lock pin passageways, each of said passageway means extending from said central recess to the periphery of said tool holder/adapter;

a plurality of elongated lock pin means, each positioned for reciprocal movement in one of said passageway means and constructed to selectively and lockingly engage said locking groove; and biasing means for coaction with each of said pin means and said passageway means for directly applying a biasing force to said pin means so as to urge pin means outwardly and away from said central recess;

wherein: said locking pin means includes retaining shoulder means thereon for cooperation with said biasing means; said passageway means including shoulder means for cooperation with said biasing means; and said biasing means comprises spring means for engagement with said pin shoulder means and said passageway shoulder means for urging said pin means outwardly from said central recess.

4. A machine tool as in claim 3, wherein said biasing means comprises a coiled compression spring surrounding at least a portion of said pin means.

5. A machine tool as in claim 3, wherein said tool holder/adapter further includes retainer means for cooperation with said lock pin means in selectively preventing movement of said pin means outwardly of said lock pin passageway means so as to assure locking engagement between said spindle nose and said tool holder/adapter.

6. A machine tool as in claim 3, wherein said turret means includes storage-ring means for receiving and storing said tool holder/adapter, said ring means having groove means therein and said tool holder/adapter lock pin means being movable from said passageway past the periphery of said tool holder/adapter for lockingly engaging said groove means and releasing said nose.

7. A machine tool as in claim 6, wherein said tool holder/adapter includes: upwardly biased retainer means having locking pin engaging land means for selectively engaging said pin when said pin means extends outwardly from said tool holder/adapter in the turret locking position so as to inhibit movement of said pin means inwardly from said position.

8. A tool holder/adapter for use in a machine tool and for cooperation with a drive spindle having a tapered nose section and a storage turret ring associated with said machine, said tool holder/adapter comprising:

a body having:
 means defining a tapered central recess for receiving a tapered spindle nose section;
 means defining a plurality of substantially radial passageways extending between said central recess and the periphery of said body;
 a plurality of locking pin means, each positioned in a passageway; and
 biasing means cooperating with each of said passageway means and lock pin means to directly bias said lock pin means outwardly toward the periphery of said body and away from said central recess means.

9. A tool holder/adapter as in claim 8 and further including upwardly biased retainer means having lock pin engaging land means for engaging each of said pins when said pins extend outwardly from said tool holder/adapter in a turret locking position so as to inhibit movement of each of said pins inwardly from said position.

10. A tool holder/adapter as in claim 8, wherein said biasing means comprises spring means cooperatively associated with said passageway means and said locking pin means so as to directly bias said locking pin means outwardly.

11. A tool holder/adapter for use in a machine tool and for cooperation with a drive spindle and a storage turret ring associated with said machine, said tool holder/adapter comprising:

a body having:
 means defining a tapered central recess for receiving a spindle nose;
 means defining a plurality of substantially radial passageways extending between said central recess and the periphery of said body;
 a plurality of locking pin means, each positioned in a passageway; and
 biasing means cooperating with each of said passageway means and lock pin means to directly bias said lock pin means outwardly toward the periphery of said body and away from said central recess means;

wherein each of said pin locking means includes shoulder defining means and each of said passageway means includes shoulder defining means, and said biasing means comprises spring means for coaction with said lock pin shoulder defining means and said passageway shoulder defining means.

12. A tool holder/adapter as in claim 11, wherein said biasing means comprises a coiled compression spring surrounding at least a portion of each of said pins.

* * * * *